United States Patent [19]

Schauder

[11] Patent Number: 4,833,588

[45] Date of Patent: May 23, 1989

[54] DIRECT AC/AC CONVERTER SYSTEM

[75] Inventor: Colin D. Schauder, Murrysville Boro., Pa.

[73] Assignee: Westinghouse Electric Corp., Pittsburgh, Pa.

[21] Appl. No.: 238,381

[22] Filed: Aug. 31, 1988

[51] Int. Cl.[4] ............................................. H02M 5/22
[52] U.S. Cl. ................................... 363/159; 318/807; 363/160; 363/163
[58] Field of Search .............................. 318/800, 807; 363/159–165

[56] References Cited

U.S. PATENT DOCUMENTS

| | | | |
|---|---|---|---|
| 4,468,725 | 8/1984 | Venturini | 363/160 |
| 4,642,751 | 2/1987 | Schauder | 363/159 |
| 4,648,022 | 3/1987 | Schauder | 363/159 |
| 4,675,802 | 6/1987 | Sugimoto | 363/163 |

OTHER PUBLICATIONS

Ziogas, Khan and Rashid, IEEE Transactions, vol. IA-21, Sep./Oct. 1985 pp. 1242-1253.
Ziogas, Khan and Rashid, IEEE Transactions, vol. IE-33, Aug. 1986 pp. 271-280.
Jose Rodriguez, IEEE IAS 1984, pp. 820-825.
Kastner and Rodrigues, 16-18 Oct. 1985 (Proceedings vol. 1 pp. 1.141-1.146), Brussels.

Primary Examiner—William H. Beha, Jr.
Attorney, Agent, or Firm—C. M. Lorin

[57] ABSTRACT

In a direct AC to AC converter system the normal rectifier assistance functions are phase modulated by a 30° lag and by a 30° lead, and switching between lagging and leading function is effected at a high frequency according to a duty cycle:

$$\tau = \frac{\cos\left(\phi - \frac{\pi}{3}\right)}{\cos\phi},$$

where $\phi = \left(\theta + \frac{\pi}{6}\right) - \frac{\pi}{6}$ mod $\frac{\pi}{3}$ and where $\theta$ is the electrical angle of the AC power supply, thereby insuring a sinusoidal input current in the system.

6 Claims, 10 Drawing Sheets

DIRECT AC/AC CONVERTER SYSTEM

BACKGROUND OF THE INVENTION

The present invention relates to the field of direct AC/AC converter systems in general and more particularly to matrix converters, i.e. wherein the conversion is performed through a plurality of bilateral switches controlled for conduction according to a matrix of existence functions. See for instance U.S. Pat. No. 4,648,022 of C. D. Schauder. This patent is hereby incorporated by reference.

As specifically explained in the afore-stated U.S. patent, a static three-phase variable speed AC motor drive is supplied with the three AC output lines of an AC/AC converter system including three groups of three bilateral switches, wherein each group pertains to one output line and the switches of a group pertain to the respective AC input lines. Such a converter may be found, as a result of a rectifier function, the equivalent of a voltage source, i.e. a fictitious DC-link created from the input line voltage, and an inverter function performed thereupon with the result applied by the groups to the respective output lines. However, as a result from the fragmented operation so performed when combining the existence functions of the bilateral switches in sequence, the input current drawn from the power supply may be loaded with harmonics rather than being a pure sinusoidal wave. The object of the present invention is to control the bilateral switches, while under output current control for the motor drive, so as to preserve an input current of highest quality on the supply side of the AC/AC converter.

Attempts have been made in the past in order to improve the quality of operation of a direct AC to AC power converter. See: U.S. Pat. No. 4,468,725 of Marco Venturini; an article by Ziogas, Khan and Rashid entitled "Some Improved Forced Commutated Cycloconverter Structures" in IEEE Transactions Vol IA-21 September/October 1985 pp 1242 to 1253; an article by Ziogas, Khan and Rashid entitled "Analysis and Design of Forced Commutated Cycloconverter Structures with Improved Transfer Characteristics" in IEEE Transactions Vol. IE-33 August 1986 pp. 271 to 280; an article by Jose Rodriguez entilted "A Four Quadrant Three-Pulse Transistor Rectifier" in IEEE IAS 1984 pp 820 to 825; and a paper by Gunther Kastner and Jose Rodriguez entitled "A Forced Commutated Cycloconverter with Control of the Source and Load" presented at the First European Conference on Power Electronics And Applications in Brussels, on 16–18 October 1985 (Proceedings vol. 1 pp. 1.141 to 1.146).

PWM modulation schemes in this context for output voltage control have been shown in the afore-stated 1985 article by Ziogas, Khan and Rashid, and also in the U.S. Pat. No. 4,648,022 of Schauder. In particular, the Schauder patent uses a PWM technique applied to the rectifier function in order to eliminate the 5th and 7th harmonics in the AC input current.

SUMMARY OF THE INVENTION

In accordance with the present invention, with a "forced commutated cycloconverter" or matrix converter, in order to obtain a sine wave AC current input, the existence functions of the bilateral switches within each group of three, associated with a corresponding phase, are controlled and established in one way to produce a "positive" polarity output voltage and in a second way to produce a "negative" polarity output voltage. Furthermore, the switch control functions are defined in such a way that the difference between the output voltage of a group of positive polarity and one of negative polarity follows the line-to-line input sinusoidal voltages, while rapidly alternating between two such input voltages so as to produce an average voltage $v_s$ equal to $3v/2 \cos \phi$, where v is the peak supply voltage to neutral and $\phi$ is a function of the mains phase angle $\theta$.

The choice of polarity for a particular group is determined in response to a current error signal which is generated for the associated output phase current to the load. Such current error is derived from the difference between a current reference and a measured feedback current. Subject to such control, it is assumed that the output load power is held to be constant. Under this assumption, and assuming that the mains voltages are pure sinewaves of fundamental frequency only, the chosen switching control functions will result in sine-wave currents in the mains having an amplitude:

$$i = \frac{2P}{3v} \cos\theta,$$

where P is the power and $\theta$ the mains electrical angle, which are in phase with the mains input voltages, i.e. there is unity power factor.

It is also provided for filtering out the high frequency component resulting from the modulation process.

DESCRIPTION OF THE INVENTION

Figure 1:
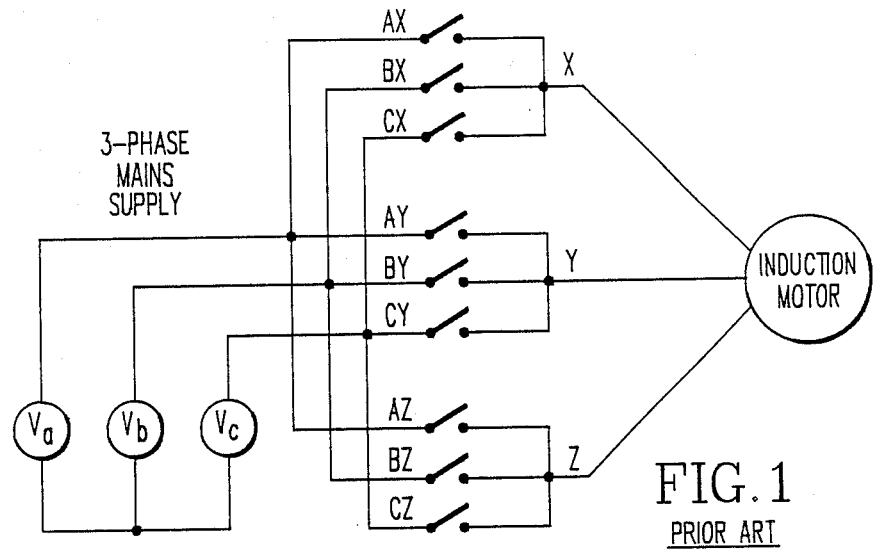
FIG. 1 shows a typical direct AC to AC converter of the nine-switch forced-commutation cycloconverter type.
Figure 2:
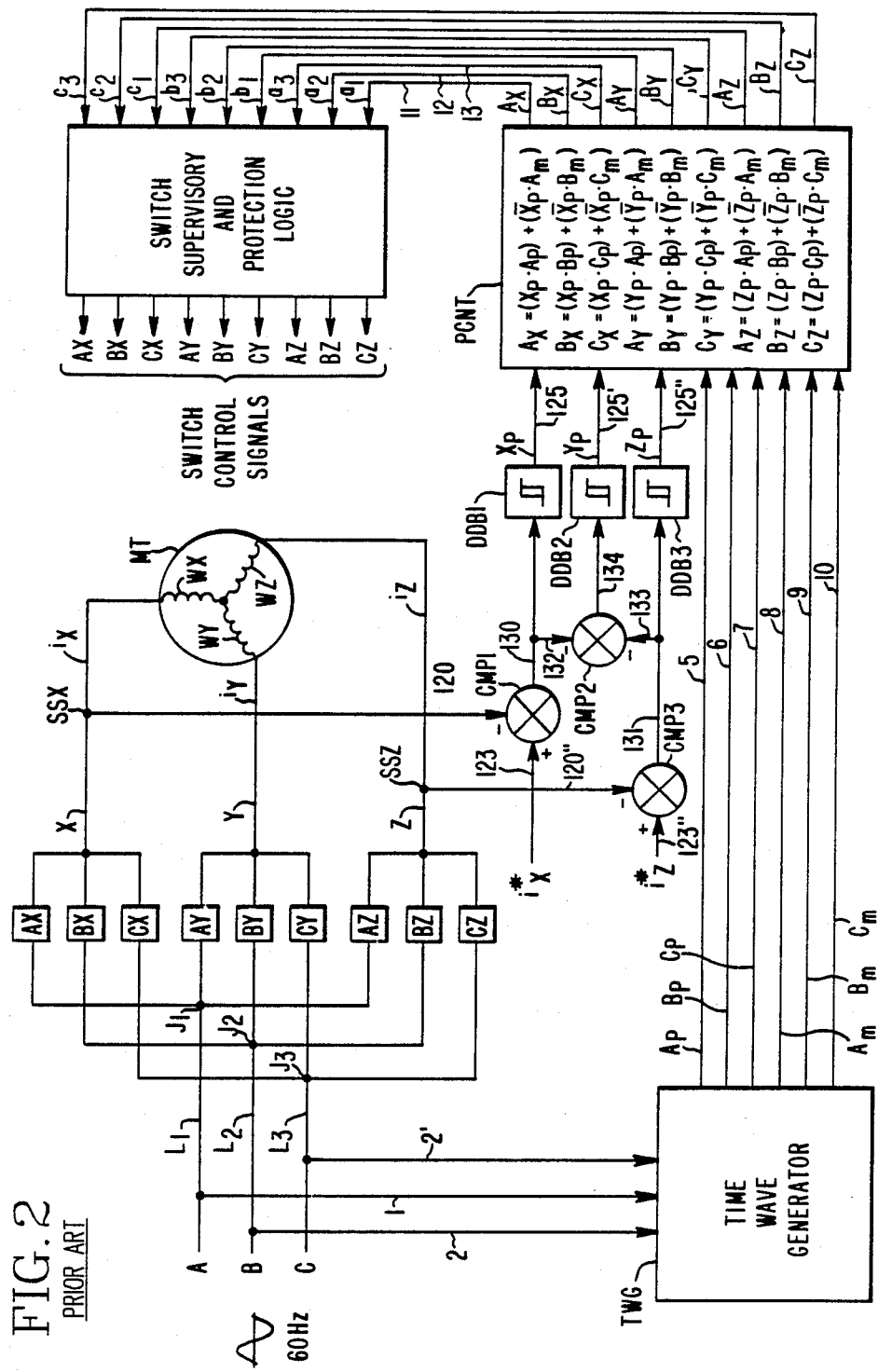
FIG. 2 is taken from U.S. Pat. No. 4,648,022 and shows a prior art matrix converter using existence function look-up tables for digital control.

Typically a matrix converter uses nine bi-directional (AC) power switches to achieve AC to AC conversion. On FIG. 1 are shown nine bi-directional switches grouped in three groups. One group GPX includes bilateral switches AX, BX, CX for input phases A, B, and C and the common ouput phase X. Similarly, AY, BY and CY form the second group GPY for output phase Y. AZ, BZ, CZ belong to the third group GPZ and output phase Z. Considering FIG. 2 which is borrowed from U.S. Pat. No. 4,648,022, a bang-bang prior art control system for such a matrix converter is given for illustration. Phases X, Y, Z are matching the internal windings (WX, WY and WZ) of an AC motor MT driven at a speed determined by the frequency of the current outputted by the converter. There is a modulation and polarity switching of the line-to-neutral output voltages VXN, VYN and VZN, in accordance with the control signals outputted, for the bilateral switches AX, BX, ... CZ of the three groups GPX, GPY, GPZ, by a programmable ROM within a main function generator, identified as PCNT in FIG. 2, which is addressed by an error signal XP, YP and ZP for the positive polarity or by an error signal Xm, Ym, Zm for the other polarity, on respective lines 125, 125' and 125". The main function generator combines those polarity signals with the positive, or the negative group "rectifier" existence functions (Ap, Bp, Cp for the positive group and Am, Bm, Cm for the negative group) derived on lines 5 to 10 from the time wave generator TWG. The error signals of lines 125, 125' and 125" are responsive to an error between the sensed currents (lines 120 and 120" for two phases) and reference signals $i_X^*$ and $i_Z^*$ (also for two phases). The error is detected by comparators CMP1, CMP2 and CMP3, for the three phases, and applied to respective deadband circuits DDB1, DDB2 and DDB3. Accordingly, the PCNT circuit generates on lines a1, a2, a3, b1, b2, ... c3 control signals for the groups GPX, GPY and GPZ which are according to the following logic table:

$$AX = (Xp.Ap) + (\overline{Xp}.Am)$$

$$BX = (Xp.Bp) + (\overline{Xp}.Bm)$$

$$CX = (Xp.Cp) + (\overline{Xp}.Cm)$$

$$AY = (Yp.Ap) + (\overline{Yp}.Am)$$

$$BY = (Yp.Bp) + (\overline{Yp}.Bm)$$

$$CY = (Yp.Cp) + (\overline{Yp}.Cm)$$

$$AZ = (Zp.Ap) + (\overline{Zp}.Am)$$

$$BZ = (Zp.Bp) + (\overline{Zp}.Bm)$$

$$CZ = (Zp.Cp) + (\overline{Zp}.Cm)$$

The signals of lines 11–13, 11'–13' and 11"–13" go to the gating circuits for groups GPX, GPY and GPX of bilateral switches (XA, XB, .. ZC).

As it appears, the matrix converter uses nine bi-directional (AC) power switches to achieve AC to AC power conversion. It has been shown that such converter system embodies the rectification and the inverter functions of the classical DC-link converter. The prior art has used high frequency switching in a matrix converter in order to obtain high bandwidth control of the converter output currents with low distortion factors. In one implementation, as shown by U.S. Pat. No. 4,642,751, the produced input current waveforms were essentially quasisquare in shape after filtering. In another implementation, as shown by U.S. Pat. No. 4,648,022, the input current waveforms are given a quality approaching the one of input currents in a twelve-pulse rectifier system, by the substantial cancellation of the fifth and seventh harmonics. The present invention aims at further improvements in the quality of the input currents with a direct AC to AC converter system, through a choice of the control strategy which will eliminate all significant low order harmonics in principle.

In U.S. Pat. No. 4,648,022 is shown a high frequency phase modulation, by + or − 15°, of the rectifier functions from the timing wave generator which eliminates the 5th and 7th harmonics. Nevertheless, with the chosen strategy, the current drawn from the mains is not the ideal sinewave. It is proposed, according to the present invention to create a rectification and an inverter function by which the resulting input current will very closely approximate a sinewave. This will appear from the embodiments described hereinafter.

Figure 3:
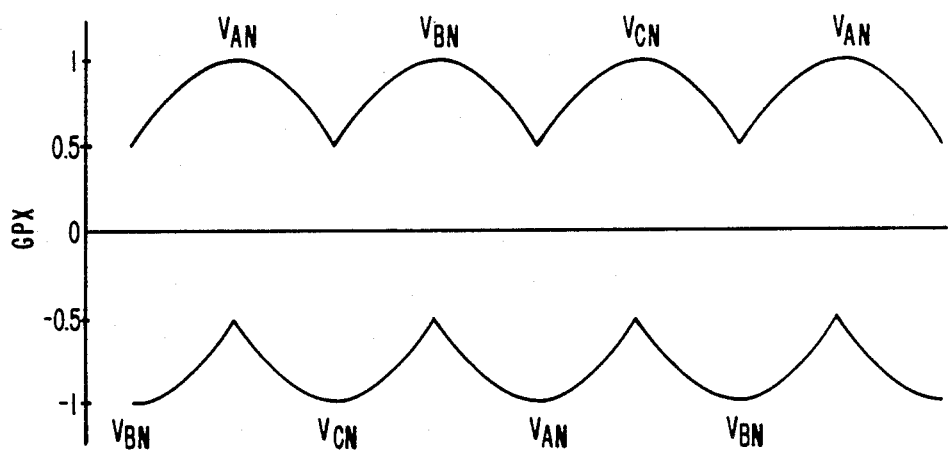
FIG. 3 illustrates the output voltages to the neutral of the power supply of the groups of bilateral switches assigned the positive polarity and those assigned the negative polarity.
Figure 4:
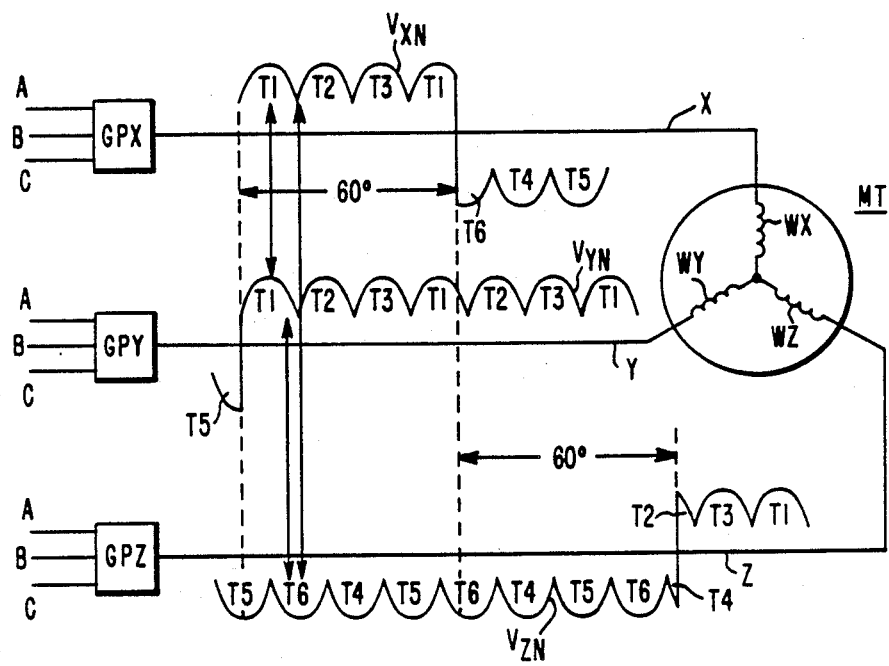
FIG. 4 illustrates the output voltages for the groups of bilateral switches and the resulting buildup of a hidden DC link voltage under the concept used in the operation of such a direct AC/AC converter.

FIG. 3 illustrates with curves the voltage-to-neutral ouput from a group of switches, achieved for positive and for negative polarity like with a rectifying bridge. FIG. 4 shows in the switching pattern of the bilateral switches how such succession of input waves is altered by inverting the polarity every 60° with one group of switches (GPX), two output lines being of the same polarity and the third one of the opposite polarity (GPZ for the first alternance, GPY for the next alternance). Thus, two output phase lines are like connected together (GPX and GPY first, then, GPX and GPZ) while the current is drawn from the voltage source via the third output phase line (GPZ, then GPY). This shows how the control methods with a matrix converter emulate the action of a DC-link voltage-source inverter. The switching strategy comprises rectifier action, concerned with obtaining either a positive or a negative group output voltage, and an inverter action concerned with switching the group polarities in such a way as to control the output voltage and current. Thus, only a single source voltage is applied to the motor at any time, while two of the motor lines are always shorted, with one of the supply lines always carrying zero current.

It appears that the current that is reflected through the source path depends upon the output power of the system (neglecting losses in the switching matrix) and upon the source voltage. In the most simple situation, the chosen voltage simply follows the envelope of the line-to-line voltages. As to the output power, as explained hereinafter, it will be assumed to be constant. The source voltage normally follows the envelope of the mains line-to-line voltages.

Figure 5A:
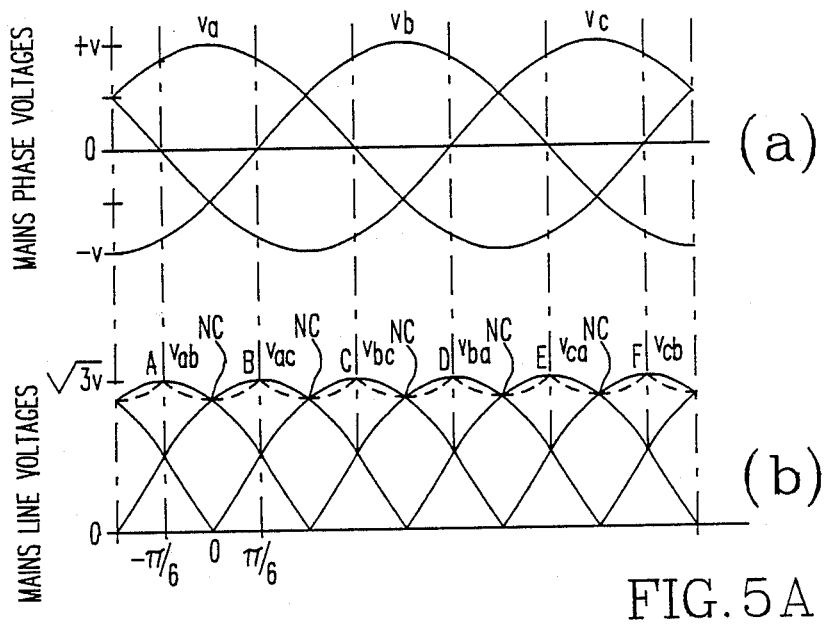
FIGS. 5A, 5B and 5C illustrate with curves the operation of the system according to the present invention.

Referring to FIG. 5A, the phase-to-neutral voltages Va, Vb and Vc, for phases A, B, C of the mains, are shown under (a), whereas under (b) are shown the associated line-to-line voltages Vab, Vac, Vbc, Vba, Vca and Vcb. The electrical angle $\theta$ (as can be derived from a phase-locked loop) is the abscissa parameter for all curves. The fictitious DC-link source voltage which, as earlier noted, normally follows the envelope of the mains line-to-line voltages, corresponds successively to Vab, Vac, Vbc, Vba. It appears, therefore, that such voltage is maximum at the peaks A, B, C, D, E, F, and is minimum when at the natural commutation point NC. This is occurring recurrently for each 60 degrees time interval such as from A to B, from B to C, from C to D, and so on. According to the present invention, by phase modulating the rectifier functions, a rapid switching is caused between pairs of available source voltages (Vab and Vac for the arch from A to B, Vac and Vbc for the arch from B to C, ...) the voltage source is so adjusted as to provide an average source voltage $v_s$, such as shown in dotted line under (b) in FIG. 5A, having identical portions along AB, BC, CD, ..., each through a 60 degree range, where:

$$v_s = \frac{3v}{2\cos\phi}$$

with $\phi = \left(\theta + \frac{\pi}{6}\right) - \frac{\pi}{6}$ and v = peak voltage difference between input line voltages and neutral.

$$\mod \frac{\pi}{3}$$

$\theta$ being the input line electrical angle.

The particular shape of each fragment of the "average" voltage obtained by phase modulation according to the present invention is governed by the following considerations:

The rectifier action defines two possible sets of switch control functions for the switches in each group. One positive set (Ap,Bp,Cp) generates a predominantly positive group output voltage relative to the mains neutral (see under (h) in FIG. 5C). Similarly, there is a negative set (Am,Bm,Cm) which generates a negative voltage. It is the difference between such positive and negative group output voltages which establishes the fictitious DC-link voltage to be used under the inverter action. Under the inverter action, this will be the only voltage applied to the motor load at any time. Furthermore, since only one switch can be ON in a group at any time, the DC-link voltage will be, at any instant, only one of the six available line-to-line voltages shown under (b) in FIG. 5A. Therefore, in a switching matrix the current reflected through the two active mains line at any instant will be determined by 1. the instantaneous output power P and 2. the line-to-line voltage. Considering the interval AB of FIG. 5A, for instance, during this period the output power will have a DC level of P watts. During this period, also, the DC-link voltage will depend upon either Vab, or Vac, but the current will flow through the A-phase input line, in either case, which will act as the positive rail of the DC-link. If v is the voltage (which between A and B may be either Vab, or Vac) and P=v·i is the power, the source current i ideally at unity power factor, for phase A during such time interval (AB) should be:

$$i(t) = \frac{2P}{3v} \cos \omega t, \text{ where } \omega t = \theta$$

With such a current, if the supply voltage is also sinusoidal and the power P is constant, this current will be flowing in phase A and this will be sufficient to insure that the corresponding B- and C- phase currents are balanced sinewaves of the same magnitude and frequency.

If the DC-link voltage is under Vab, the A-phase current $i_a$ during the interval AB will be:

$$i_a(t) = \frac{P}{\sqrt{3} \ v \cos\left(\omega t + \frac{\pi}{6}\right)}$$

If the DC-link voltage is under Vac, the A-phase current during the interval AB will be:

$$i_a(t) = \frac{P}{\sqrt{3} \ v \cos\left(\omega t - \frac{\pi}{6}\right)}$$

This can be seen from considering the interval between A and B under curves (b) of FIG. 5A. The normal rectifier existence functions correspond to the arches AB, BC, CD, ... from one natural commutation point NC to another. When Vab and Vac are considered, according to the present invention the modulation is made between A and NC, then, between NC and B, which implies that in the first instance the normal rectifier existence function is lagging by $\pi/6$ (relative to NC) and, in the second instance, it is leading by $\pi/6$ (relative to NC). Therefore, according to the present invention, the choice of Vab, or Vac, during time interval AB will be alternatively exchanged at a high frequency by choosing alternatively a lagging normal rectifier existence function and a leading one, the lag and lead being of $\pi/6$, so that the average value of the current flowing in the A-phase will be a sinewave. This is accomplished by applying a duty cycle $\tau$ for the effective voltage source such that the fraction of time $\tau$ spent on the more lagging voltage be given by:

$$\tau = \frac{\cos\left(\phi - \frac{\pi}{3}\right)}{\cos \phi}$$

(Vab is the leading voltage, the other Vac is the lagging voltage, within the time interval AB). With such phase modulation between A and B, the moving average of the DC-link voltage is $$v_s = \frac{3v}{2\cos\phi},$$

which is the dotted line AB of FIG. 5A.

It is observed that such fraction of time $\tau$ is independent of the power P and of the voltage amplitude. It only depends on the mains phase angle $\theta$. Advantage will be taken of this fact in the implementation of FIG. 6.

What has been said of time interval AB, can be said for the intervals BC; CD; DE; and EF of FIG. 5A. A general expression of the fraction of the total time spent on the more lagging of the two alternative source voltages in order to insure that the mains currents are sinusoidal is:

$$\tau = \frac{\cos\left(\phi - \frac{\pi}{3}\right)}{\cos\phi} \text{ where } \phi = \left(\theta + \frac{\pi}{6}\right) - \frac{\pi}{6}$$

$$\mod \frac{\pi}{3}$$

This equation defines an angle $\phi$ which, as shown under (b) in FIG. 5A, goes from $-\pi/6$ to $+\pi/6$. This definition of $\tau$ will determine the phase control function applied for modulation to the rectifier control functions for the positive and the negative group output voltages. The control functions are illustratively and graphically given on FIGS. 5B to 5C under (c) to (h).

Figure 5B:
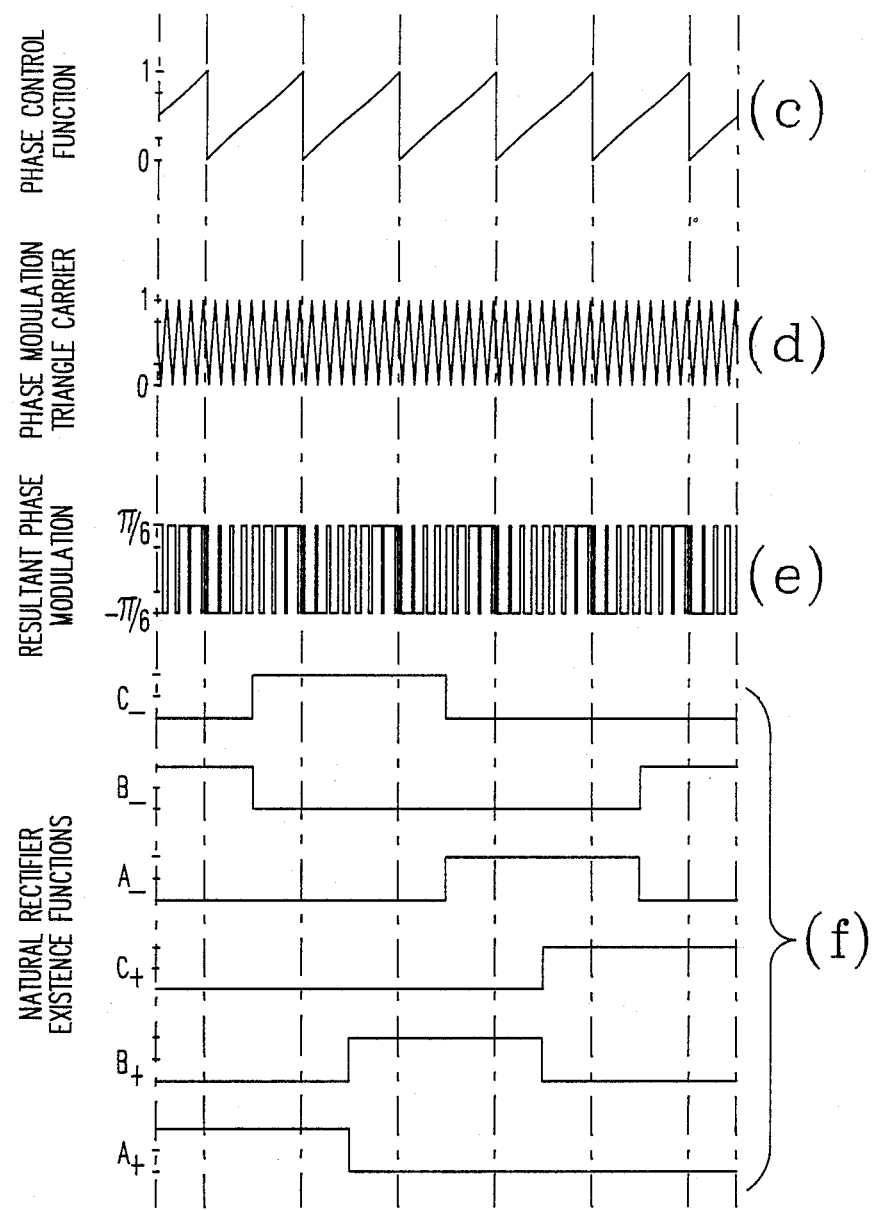

Curve (c) of FIG. 5B shows the phase control function establishing between each 60 degree interval (such as AB, BC, CD, ... of curves (b) of FIG. 5A) a function of increasing from zero to unity and defining the fraction of time that the operation is upon one voltage as opposed to the other voltage. The duration of application of such voltage in each alternance is determined by the high frequency phase modulation triangle carrier signal shown under (d). The result, at the intersection of the two curves under (c) and (d), is a phase modulation control function which defines, as earlier stated, whether the "normal" rectifier functions, shown under (f) in FIG. 5B, must be advanced by $\pi/6$, or retarded by $\pi/6$, in order to achieve the alternation of source voltages (Vab and Vac from A to NC, Vac and Vbc from NC to B, Vac and Vbc from B to NC, and so on). The resulting phase-modulated rectification existence functions are shown under (g), namely Cm, Bm, Am, Cp, Bp, and Ap. Inspection of the modulated functions under (g) shows that they will achieve the intended result. For instance, while a positive group voltage is obtained by keeping Ap continuously true, the corresponding negative group voltages are obtained by alternating between Bm and Cm under the prescribed duty cycle $\tau$, and so on for the other 60 degree intervals.

Figure 5C:
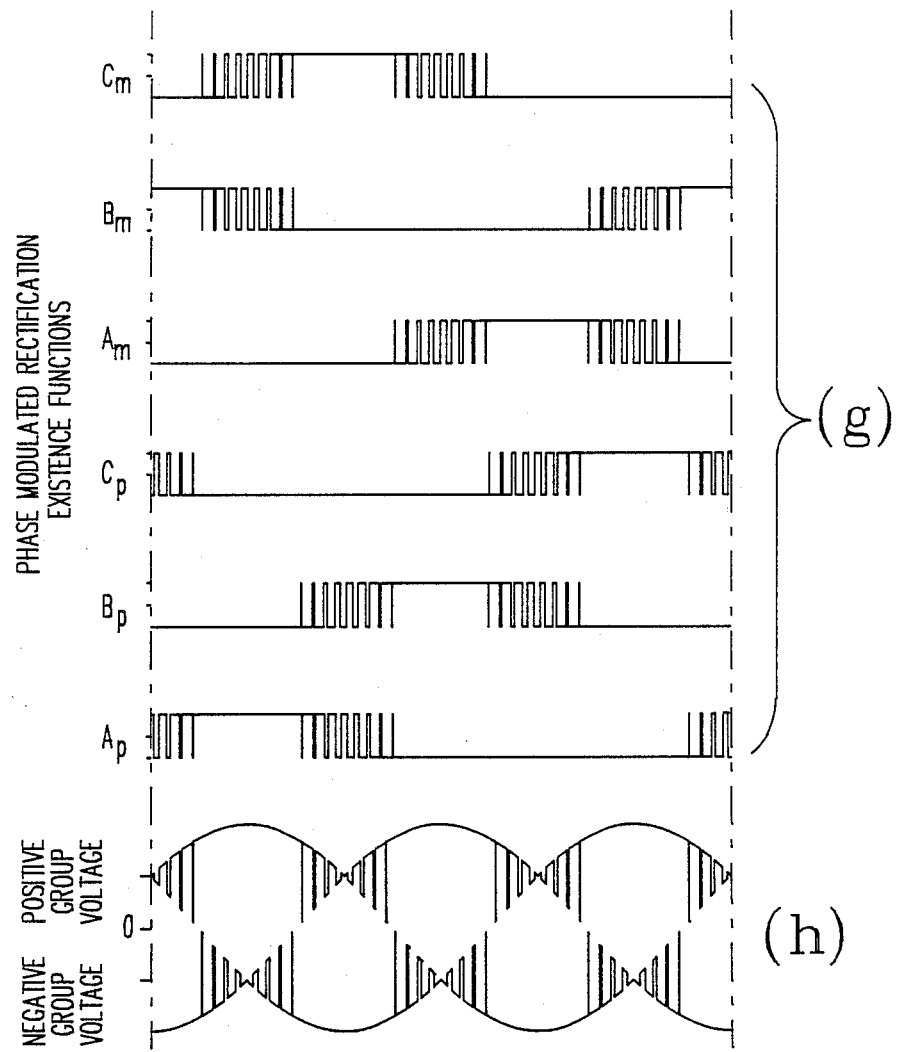
Figure 6:
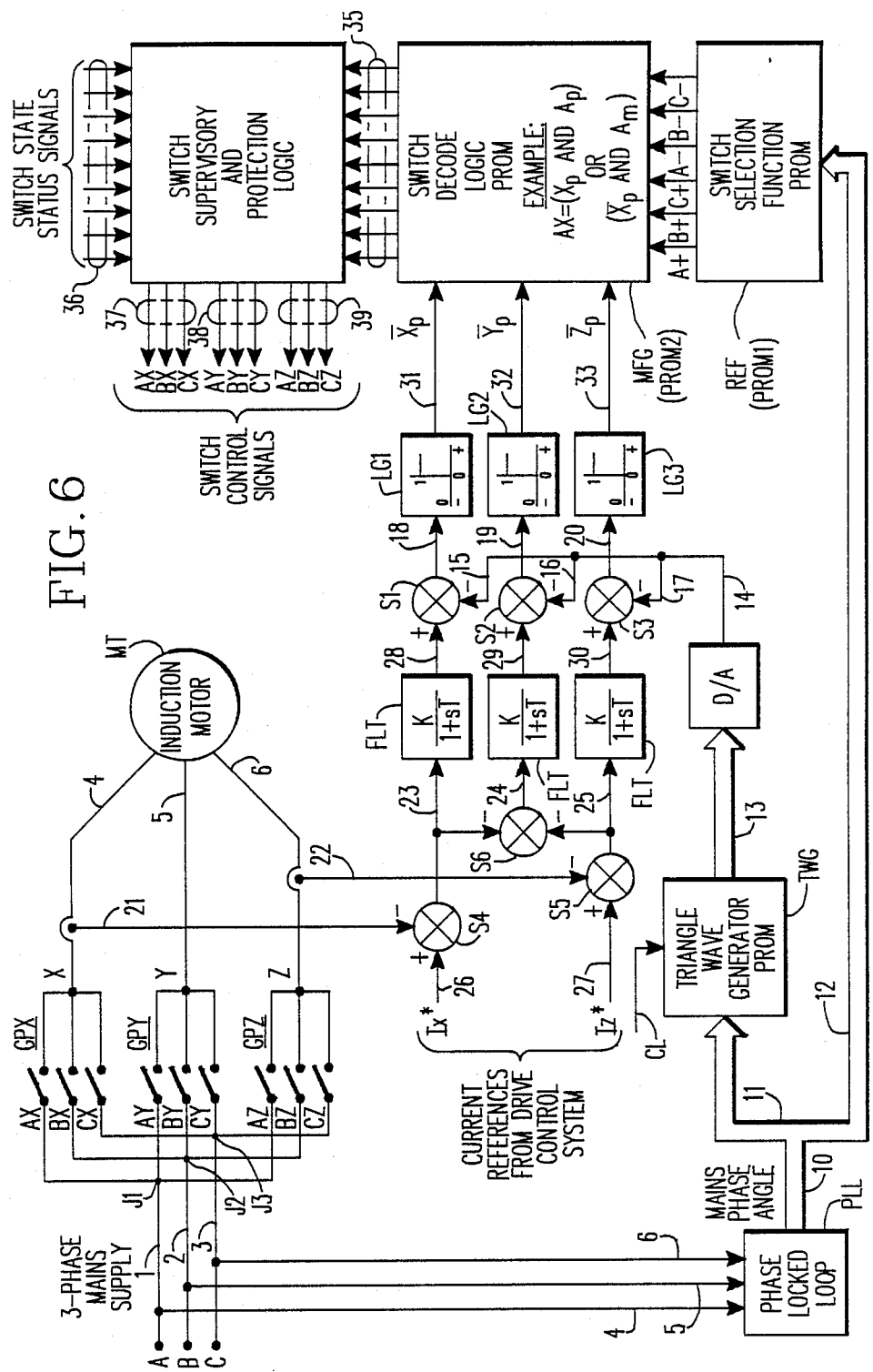
FIG. 6 shows an open loop implementation of a direct AC/AC converter system according to the present invention.

Referring to FIG. 6, circuitry is shown in diagram form as can be used to implement in an open-loop fashion (i.e. by generating within switch selection circuit REF pre-programmed modulated rectifier existence functions) the control functions illustrated by FIGS. 5A to 5C. From the mains lines 1, 2, 3 of phases A, B, C at the input of the converter are derived by lines 4, 5, 6 the input lines to a phase-locked loop circuit PLL generating on lines 10, 11 and 12 the electrical angle as a function of time. The matrix converter is illustrated as a nine-switch forced-commutated cycloconverter like in FIG. 1. From two phases X and Z at the output of the converter are derived by lines 21 and 22 signals representing the phase currents into the motor MT. These are matched within comparators S4 and S5, respectively, with current references IX and IZ for the same phases and current errors are generated on lines 23 and 25 from which is derived on line 24, through a summer S6, the current error corresponding to the third phase Y. After filtering with gain at FLT, these current errors are applied on line 28, 29, 30, respectively, to subtractors S1, S2, S3 which determine the intersection with an amplitude-modulated triangle wave obtained from block TWG which is responsive to the detected mains phase angle $\theta$. As a result is generated on respective lines 18, 19 and 20, in accordance with normal PWM generation principles, a voltage command determining which polarity is to be selected and how long among the rectifier existence functions derived from the switch selection function generator REF (PROM1). The pulse-width modulated polarity signal is effective within the main function generator MFG (PROM2) upon the rectifier existence functions so derived from REF (PROM2). As explained by reference to FIG. 6A, this switch selection function generator REF differs from the logic PCNT shown in prior art FIG. 1. Normally, like with FIG. 1 of the afore-mentioned U.S. Pat. No. 4,648,022, the electrical angle from line 10 is applied by line 12 as an address to a switch selection logic REF in the form of a PROM, which outputs the rectifier existence functions for positive and negative polarity: (Ap, Bp, Cp) and (Am, Bm, Cm). Concurrently, the required polarity is requested on lines 31, 32, 33 as XP or $\overline{Xp}$, Yp or $\overline{Yp}$, Zp or $\overline{Zp}$ depending upon which group. In the prior art a bang-bang technique was used with the assist of deadband circuits. In FIG. 6 are used, instead, logic circuits LG1, LG2, LG3 responding to lines 28, 29, 30 and providing the logic One or the logic Zero in a pulse-modulated fashion, depending upon the outputted error signal of lines 28, 29 and 30. Accordingly, the main function generator MFG establishes the following combinations: AX (for the first switch of group GPX)=(Xp AND Ap) and alternatively ($\overline{Xp}$ AND Am); BX=(Xp AND Bp) and alternatively ($\overline{Xp}$ AND Bm); etc. under pulse-width modulation.

A major distinction over the prior art, however, resides according to the present invention in that within the PROM (PROM1) of circuit REF of FIG. 6 the normal rectifier existence functions provided are modulated by $+\pi/6$ and by $-\pi/6$, as stated earlier, for AB, BC, CD, ... about the NC points. This will appear more clearly from the following description of FIG. 6A.

Figure 6A:
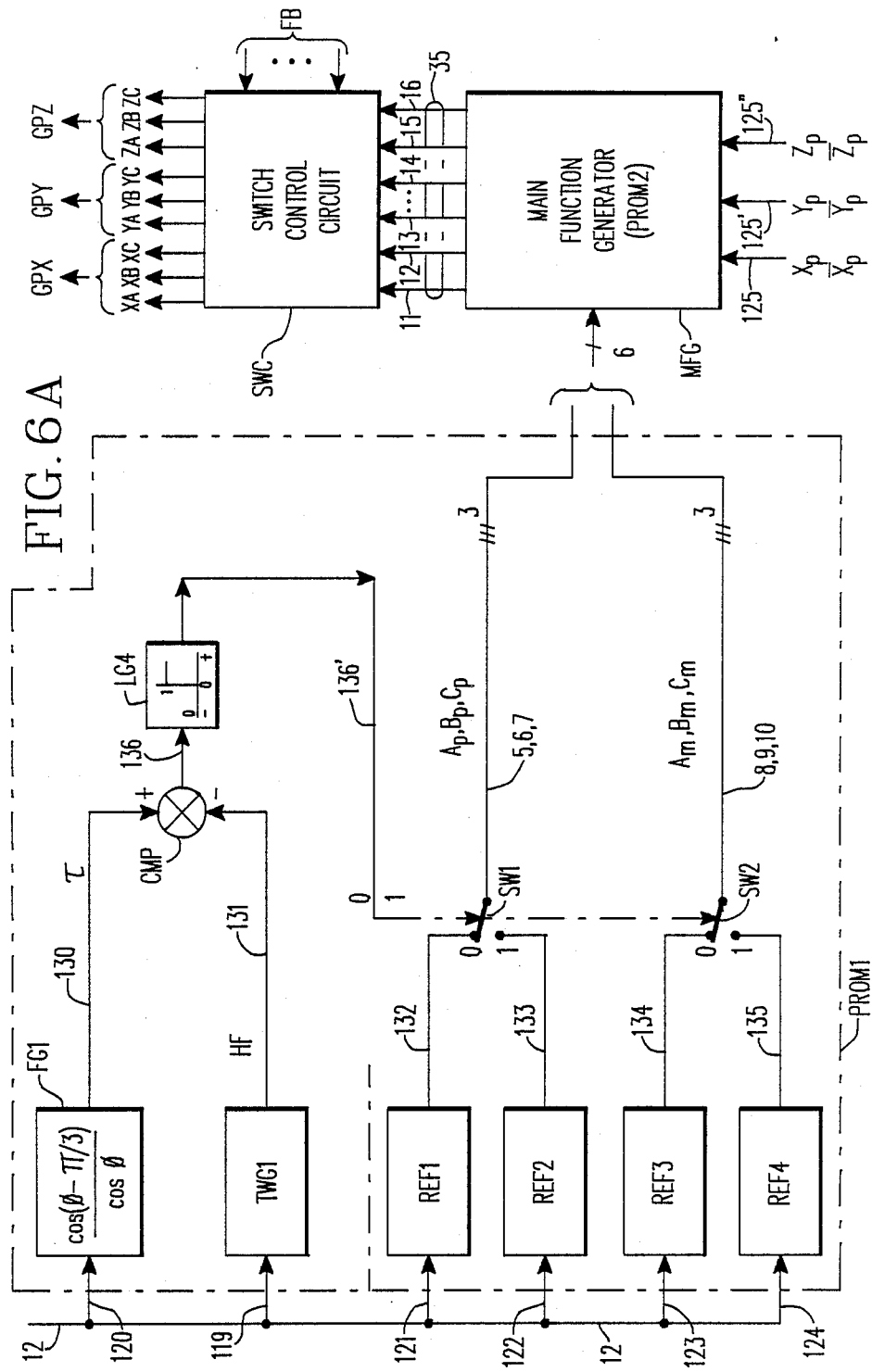
FIG. 6A is an illustration in block diagram of the implementation of the phase modulation according to the invention in FIG. 6.

Referring to FIG. 6A, the implementation of the phase modulation of the rectifier existence functions within the rectifier existence function generator REF (PROM1) is illustrated as a block diagram. The electrical angle derived from line 12 is first applied via line 120 to a function generator FG1 effectuating as a function of $\phi$ and in accordance with the formula:

$$\tau = \frac{\cos\left(\phi - \frac{\pi}{3}\right)}{\cos\phi}$$

the calculation of $\tau$ through each successive range of 60 degrees marking the arches AB, BC, ... shown in FIG. 5A. A comparator CMP responds to the outputted value of $\tau$ on line 130 and to a high frequency triangular wave derived on line 131 from a triangle wave generator TWG1 synchronized by line 119 with the electrical angle of line 12. The modulated wave is passed on line 136 to a logic circuit LG4 which establishes either a logic One or a logic Zero onto line 136', depending upon the duty cycle defined by $\tau$ on line 130, thereby defining a duration for the ups and downs of curve (e) of FIG. 5B. This logic succession of a One and a Zero is applied on line 136' to the moving arms of two switches SW1 and SW2 which select for the duration so defined either one of two sets of phase-modulated natural rectifier existence functions according to curve (f) of FIG. 5B, i.e. (Ap, Bp, Cp) on respective lines 5, 6, 7 or (Am, Bm, Cm) on respective lines 8, 9, 10. These two sets, one leading by $\pi/6$, the other lagging by $\pi/6$, are stored as rectifier existence functions in blocks REF1 and REF2

(for the positive polarity) and in blocks REF3 and REF4 (for the negative polarity). These blocks respond, on respective lines 121, 122, 123, 124, to electrical angle θ of line 12. The two blocks REF1 and REF2 are under selection by switch SW1 and are associated with the positive polarity. Typically, PROM REF1 contains the normal rectifier functions with a 30 degree phase shift lag whereas PROM REF2 contains the same functions with a 30 degree lead. Switch SW1 changes its position in accordance with the logic carried on line 136' thereby deriving alternatively the set of PROM REF1 or the set of PROM REF2 via lines 132 and 133, respectively, thereby accomplishing the phase modulation shown under FIG. 5C for Ap, Bp and Cp, which are in turn applied by lines 5, 6, 7, respectively, to the main function generator MFG. In a similar way, for the negative polarity, REF3 and REF4 contain as PROM's the normal rectifier existence function, one with a 30 degree lead, the other with a 30 degree lag, and switch SW2 operates at high frequency to alternate positions in accordance with the logic of line 136', thereby phase modulating the outputted rectifier existence function and provide Am, Bm and Cm on respective lines 8, 9, 10 toward the main function generator MFG. On the other hand, polarity selection prescribed for switches AX, BX, ... AZ, BZ, CZ is applied by lines 31, 32, 33 to the main function generator MFG leading to either (Xp.Ap) or ($\overline{Xp}$.Am) for AX, to (Xp.Bp) or ($\overline{Xp}$.Bm) for BX, etc. The result is the control signals of lines 35 into the switch supervisory and protection logic SWC, which responds on lines FBS to the feedback signals, for effective control of the switches within theirs groups GPX, GPY and GPZ.

The invention will now be described functionally by reference to: FIG. 1 which shows the groups of bilateral switches in relation between AC input and AC output phases; FIGS. 5A to 5C which show the mains AC input voltages in relation with the generated output voltages as well as the rectifier existence functions involved; and FIG. 7 which illustrates the resulting modulated output voltage.

Under the rectifier existence functions used in a direct AC to AC converter for generating a voltage source as the expression of the fictitious DC-link therein, at any given time one bilateral switch belonging to one group (GPX, GPY or GPZ) is closed to establish on the corresponding output line (X, Y, or Z) one polarity (positive, or negative). As to the second polarity, two bilateral switches belonging to the two other groups, respectively, are closed in order to establish on the corresponding output lines the second polarity. These other switches may be BY and BZ for output lines Y and X, if GPX is used for the first polarity. They may also be CY and CZ. For instance, if AX is closed (within group GPX) giving a positive voltage on line X, with respect to the other polarity (negative) there will be a closed state for BY and BZ and the voltage source will appear between Y and X as well as between Z and X. Otherwise, there may be a closed state for CY and CZ, and the voltage source will appear between line X and the same two other output lines Y and Z. At another time the voltage source could be between the single ouput line Y, for instance (which could be positive or negative) and an opposite combination of switches within groups GPX and GPZ for output lines X and Z, for the other polarity. Thus, at any given time, the voltage source appears between one output phase line under one group of bilateral switches and two "short-circuited" lines belonging to the two last groups, respectively.

However, as seen from the output end of the converter, such associated lines of opposite polarities sustaining the voltage source are in fact connected through the closed switches belonging to phases A, B, and/or C. Therefore, at any given time the voltage source will look as one of six line-to-line input voltages: Vab, Vbc, Vba, Vca, Vcb and Vac. It is also observed that such successive portions of the line-to-line voltages (shown under (b) in FIG. 5A) are not constant as a voltage source. It is the object of the present invention, to so control the bilateral switches by modulation on top of the rectifier existence functions that the input current drawn from the AC input supply be sinusoidal.

The invention is based upon the following observations: since at any instant as a result of two conducting switches in two different groups, two output lines are in fact bridged with two input lines, a line-to-line voltage from the AC input appears as the voltage source between the two output phases defined by the two operating switches of opposite polarity under the rectifier existence functions. Moreover, since there is a choice between two switches in a group to define one of the two polarities at the output, there are two possible line-to-line voltages available at the AC input supply to provide the voltage source.

Accordingly, it is now proposed to alternately select at high frequency and with a particular duty cycle one and the other of such two line-to-line voltages, thereby to obtain a voltage source following the dotted line of FIG. 5A as an average voltage source, Vs being defined as:

$$v_s = \frac{3v}{2\cos\phi}$$

where v is the peak voltage difference between input line and neutral, and:

$$\phi = \left(\theta + \frac{\pi}{6}\right) - \frac{\pi}{6}$$

$$\mod \frac{\pi}{3}$$

the power P at the AC input power supply being held constant, thereby to obtain a sinusoidal input current.

Since such voltage source is still varying upon every 60 degree angle of the AC input between peak value and the natural commutation point, a compensating effect is created when performing the inverter function so as to translate output control as if the voltage source were constant. This is accomplished by imposing the same duty cycle and amplitude, in a compensating manner symbolized by line CL, to the triangle wave generator TWG of FIG. 6. Actually the PROM within the generator receives a corresponding definition. The effect of such compensation will appear where lines 15, 16, 17 meet with lines 18, 19, 20, namely within S1, S2, S3.

For the purpose of illustration, considering under (g) in FIG. 5C the modulations effected under Cm and Bm to the left which is concurrent with the non-modulated portion of Ap, it is seen that under pulse-width modulation for the minimum polarity (negative) the duty cycle alternately places under conduction BY and BZ (for Vab and Bm), or CY and CZ (for Vac and Cm) when AX is conducting for the positive polarity in group GPX. The range of such modulation is 60 degrees extending from A to B under (b) of FIG. 5A. The same is repeated for the adjacent range of 60 degrees (BC), and so on.

Having so defined the fictitious DC-link generated by the rectifier existence functions (within block REF of FIG. 6), control is effected under such voltage source to accomplish an inverter function, thereby to generate the output voltages and currents on the three lines X, Y, Z. This is done within the main function generator MFG of FIG. 6 in response to: 1. the two sets of rectifier existence functions, (Ap, Bp, Cp) for one polarity and (Am, Bm, Cm) for the other polarity, derived from REF; and 2. the "polarity" selecting control signals 31, 32, 33.

Figure 7:
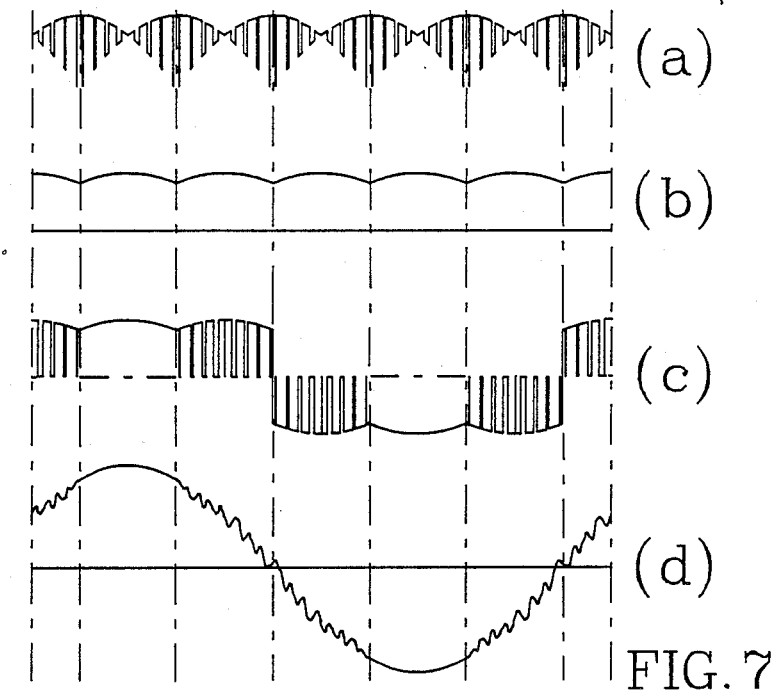
FIG. 7 shows with curves the generation of an input current of quasi perfect sinewave form according to the implementation of FIGS. 5A to 5C and 6, assuming a particular form of the current wave drawn from the fictitious DC-link voltage.

FIG. 7 shows under (a) the effect of the phase modulation of the rectifier functions according to the present invention upon the voltage waves of FIG. 5A under (b). For illustration, it is assumed that an average current (shown under (b) in FIG. 7) is drawn from the fictitious DC-link voltage. Under (c) is shown the unfiltered mains current corresponding to the load. After filtering the high frequency "noise" caused by the modulation, a sinusoidal input current wave is obtained as shown under (d) and as anticipated.

Figure 8:
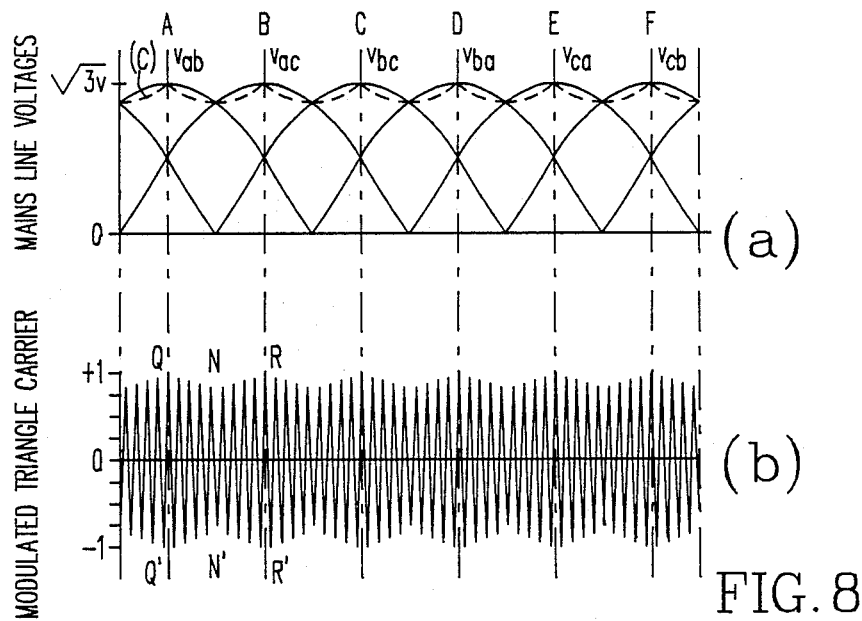
FIG. 8 is a graphic representation associating the average source voltage of FIG. 5A with a modulating triangle wave applied for pulse width modulation in order to eliminate gain changes in the current control loops due to the low frequency harmonics in the fictitious DC-link voltage, according to the invention.

As shown in FIG. 8, modulation along successive ranges AB, BC, CD, . . . leaves an average voltage $v_s$ shown in dotted line which corresponds to the formula:

$$v_s = \frac{3v}{2\cos\phi}$$

It is noticed, that $v_s$ is varying, which introduces low frequency gain variations into the inverter current loops. A correcting factor, therefore, is generated as a function of the mains phase angle $\theta$. Such correction is conveniently applied by means of an amplitude compensating modulation applied onto the pulse-width modulator TWG of FIG. 6, namely as symbolized by corrective line CL, by changing the amplitude of the triangle wave circuit TWG circuit in proportion to $1/\cos\phi$. Increasing the amplitude of the triangle wave amounts to decreasing the gain of the current control loops and, conversely, for a decrease of such amplitude. Therefore, a correcting effect appears from such modulated cusp-like triangular wave which is matching the original cusp-like shape of the average voltage $v_s$ shown under (b) in FIG. 6. Thus, QR and Q'R' on opposite polarity sides under (b) are matching AB of the dotted line shape under (a). The result of such amplitude modulation effected upon the triangle wave of line 13 is that the output current control loops on lines 31, 32, 33 automatically correct for the effect from the REF circuit within the main function generator MFG.

Figure 9:
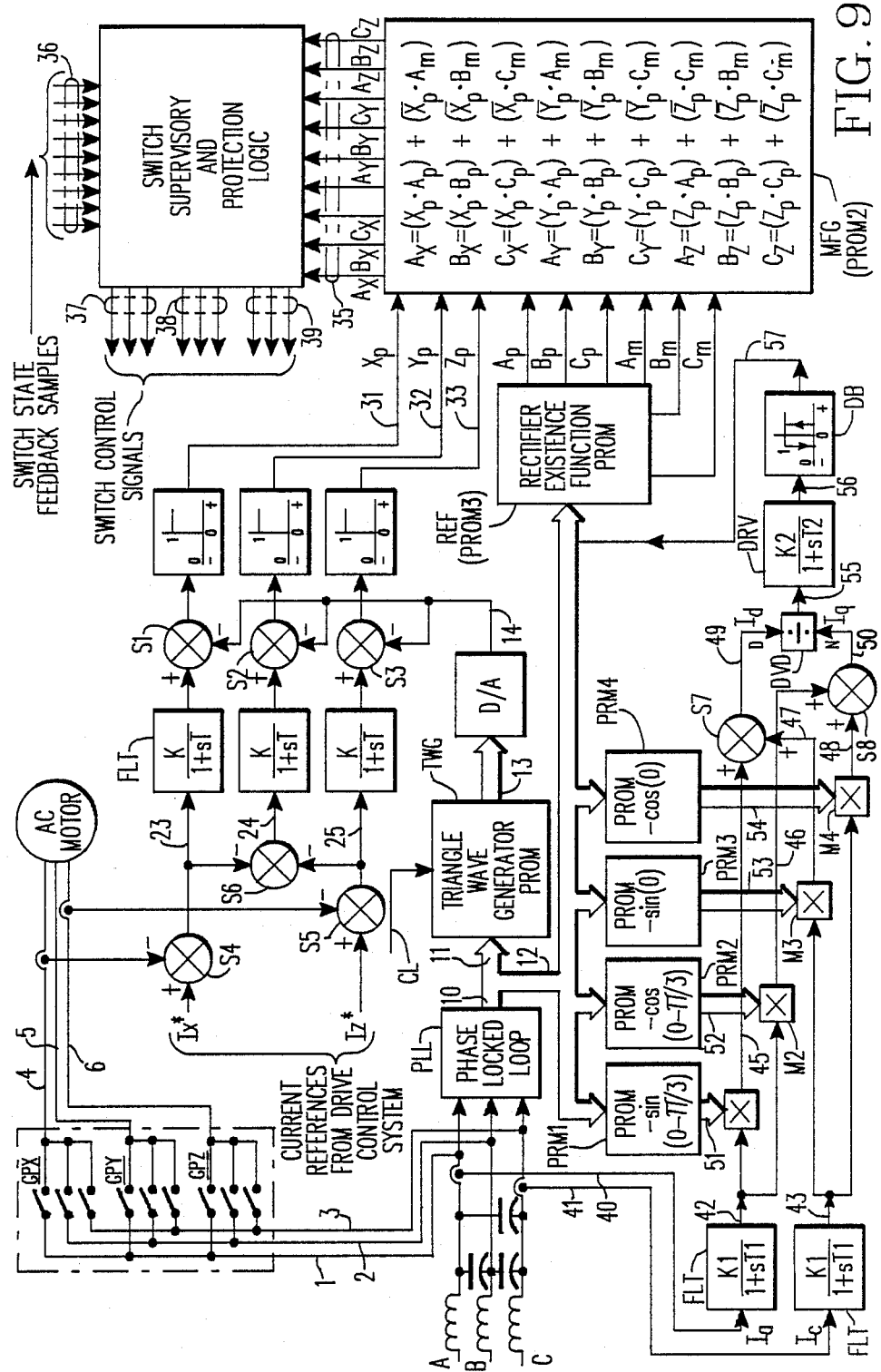
FIG. 9 shows a closed-loop implementation of the system according to the present invention.

FIG. 9 illustrates another implementation of the modulation scheme according to the present invention. FIG. 6 is an open loop prescribed by the formulation of the existence functions within PROM1 in accordance with the definition of $\tau$. FIG. 9 relates to a closed-loop implementation. As earlier stated, it is based upon the concept that the intended ideal input current involves phase modulation of the normal rectifier existence functions by phase-advancing, or by phase-retarding, the normal rectification existence functions (as illustrated within REF1 to REF4 of FIG. 6A). Accordingly, the byte received on lines 10 and 12 to select the existence functions from the PROM (PROM1) in accordance with the running electrical angle $\theta$, is extended by one bit received from line 57. When line 57 carries a One the existence functions used will be the phase-advanced rectifier functions like those of REF1 and REF2 of FIG. 6A. When line 57 carries a Zero, it will be the phase-retarded rectifier existence functions like those of REF3 and REF4 in FIG. 6A.

On lines 40 and 41 are derived signals representing the input current $i_a$ for phase A and input current $i_b$ for phase B. After filtering at FLT, these two currents, on lines 42, 43, are subjected to a rotating axis coordinate transformation through the mains phase angle, according to the formula:

$$\begin{bmatrix} i_d \\ i_q \end{bmatrix} = \begin{bmatrix} -\sin(\theta - \pi/3) & -\sin\theta \\ -\cos(\theta - \pi/3) & -\cos\theta \end{bmatrix} \begin{bmatrix} i_a \\ i_b \end{bmatrix}$$

where $i_d$ and $i_q$ are the direct and the quadrature components, respectively, and the d-axis coincides with the vector representing the mains voltage.

This is implemented by deriving via lines 10 and 12: the running values of $-\sin(\theta-\pi/3)$ from PRM1 (a PROM) onto line 51 and multiplier M1; the running value of $-\cos(\theta-\pi/3)$ from PRM2 onto line 52; the running value of $-\sin\theta$ from PRM3 onto line 53 and multiplier M3; and the running value of $-\cos\theta$ from PRM4 onto line 54 and multiplier M4. Adder S7 combines the result on line 45 of M1 with $i_a$ from line 42, with the result on line 47 of M3 with $i_c$ from line 43. Similarly, adder S8 combines the result on line 46 of M2 with $i_a$ from line 42 with the result on line 48 of M4 with $i_c$ from line 43. Accordingly, S7 provides on line 49 the direct component $i_d$ and S8 provides on line 50 the quadrature component $i_q$ after such transformation. Lines 49 and 50 go to a divider DVR yielding the tangent of the power factor angle $\delta$. Since it is intended to keep the tangent to zero for unity power factor, as originally assumed, a dead-band circuit DDB is provided in response to line 56 from divider DVR. Therefore, on line 57 will appear a One whenever the tangent is positive by more than the deadband DDB, and a Zero whenever the tangent is negative by more than the deadband DDB. A phase shift in either way is caused to the extent of $\pi/6$ (like the 30 degree modulation of the rectifier functions caused upon REF1 to REF4 in the open loop implementation of FIG. 6A) by choosing within the PROM (PROM1) one set of existence functions (positive) or the other (negative), as earlier stated.

Figure 10:
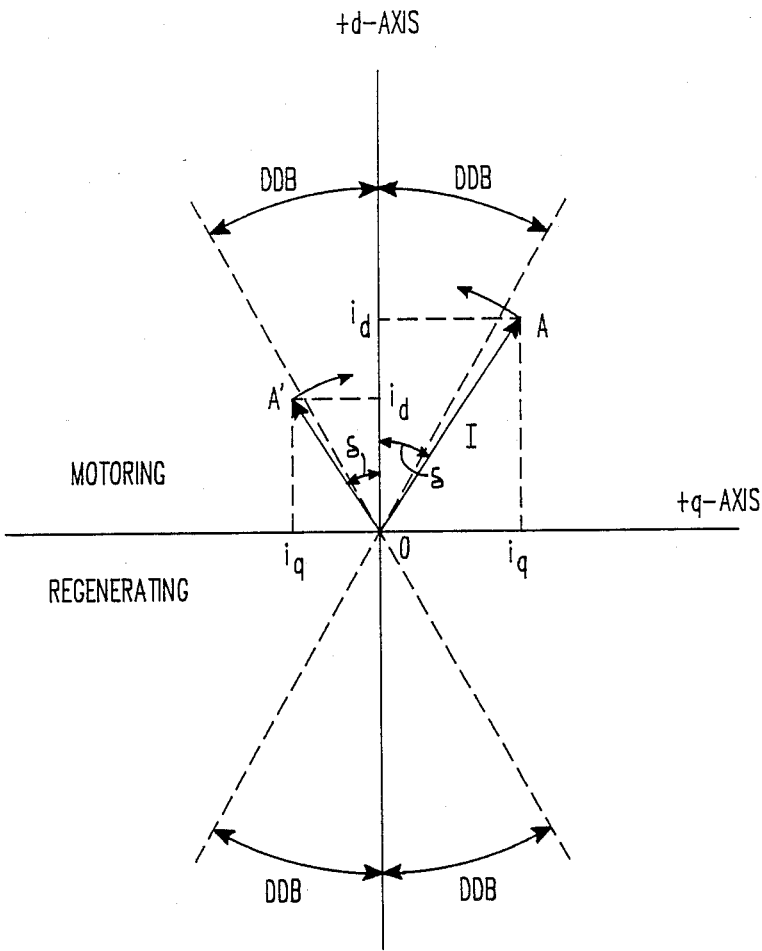
FIG. 10 is a vectorial representation of the operation of the system of FIG. 9.

FIG. 10 is a vector diagram showing the dead-band imposed by circuit DDB of FIG. 9 relative to the direct and the quadrature axes. The current vector OA is shown where both the direct-axis component and the quadrature-axis components are positive when the system is motoring, thus, the vector is above-axis. OA' is the current vector in the same mode where the quadrature component is negative. If tangent $\delta$ is $i_d/i_q$, where id is the direct current component and iq the quadrature component, the tangent is positive in the first instance, negative in the second instance. Each time the deadband DDB is exceeded (for instance, current vector OA incurs a tangent beyond line DDB), the logic of line 57 as the most significant bit causes the other polarity set of rectifier existence functions to be selected within PROM1. As a result, the current vector is forced to go into alignment with the d-axis. While so doing the system reacts by lines 49 and 50 causing the tangent to change polarity, namely as the current vector goes beyond DDB. Accordingly, line 57 will force each time the current vector to go back into alignment with the d-axis, and the correcting effect will bring back line 57 to the opposite logic, in a bang-bang fashion. The same can be said in the case of the regenerating mode of operation, in which case vectors like OA and OA' will appear below the q-axis, rather than above, and symmetrically relative to the center O of the axes.

I claim:

1. In a direct AC to AC converter system connected to an output load and including nine bilateral switches grouped by groups of three, each switch in one group being associated with a corresponding common output phase line and the switches of each group being associated with the respective input line phases;

rectifier existence function means being provided for operating for conduction one switch of one group according to one of two polarities applicable to the associated ouput phase line, and for operating for conduction one pair of respective switches in the two other groups having a common input phase line and according to the other polarity, to derive between said associated output phase line and the two other output phase lines a voltage source defined by the line-to-line input voltage between said common input phase line and the input phase line related to said one switch of one group; and means operative with said rectifier existence function means for controlling said bilateral switches in accordance with an inverter function with regard to said output phase lines and under said voltage source;

the combination of:

means operative upon said rectifier existence function means for switching at a high frequency and alternatively from one pair of said respective switches relative to one common input phase line to another pair of said respective switches relative to the other common input phase line, and for establishing an average voltage source vs according to the formula:

$$v_s = \frac{3v}{2\cos\phi}$$

where v is the peak voltage of said AC input and where $\phi$ is a function of the electrical angle $\theta$ of the AC input as follows:

$$\phi = \left(\theta + \frac{\pi}{6}\right) - \frac{\pi}{6}$$

$$\mod \frac{\pi}{3}$$

whereby a sinusoidal input current is derived from said AC input.

2. The system of claim 1 with said switching operation being effected with a duty cycle $\tau$, where:

$$\tau = \frac{\cos\left(\phi - \frac{\pi}{3}\right)}{\cos\phi}$$

3. The system of claim 2 with said rectifier existence function means comprising: (1) a PROM having stored therein normal rectifier existence functions in two sets, one set for the respective input phase lines and for one polarity, the other set for the respective input phase lines and the other polarity; and (2) means for providing in each set a first subset representing said normal rectifier existence functions with a lag of $\pi/6$ and a second subset representing said normal rectifier functions with a lead of $\pi/6$; and pulse-width modulation means being provided operative on said subset providing means for shifting from one subset to the other subset in each of said sets and at said high frequency with said duty cycle.

4. The system of claim 3 with said inverter function being performed with means responsive to the currents of said common output phase lines and to corresponding reference signals for generating voltage demand signals associated with the respective common output phases;

another pulse-width modulating means being provided responsive to said input phase lines for modulating said voltage demand signals;

thereby to provide polarity selecting signals for said existence functions.

5. The system of claim 4 with said another pulse-width modulating means having an amplitude modulated in proportion to:

$$1/\cos\phi; \text{ where } \phi = \left(\theta + \frac{\pi}{6}\right) - \frac{\pi}{6}$$

$$\mod \frac{\pi}{3}$$

6. The system of claim 4 with means responsive to said input phase lines for deriving a first signal representative of the direct input current, and means responsive to said input phase lines for deriving a second signal representative of the quadrature input current;

means being provided responsive to said first and second signals for generating a signal representative of the ratio between said first and second signal;

said rectifier existence function means including a first set of rectifier existence functions for one polarity of said switches and a second set of rectifier existence functions for the other polarity; and bang-bang means responsive to said ratio signal for selecting one of said first and second sets in accordance with the sign of said ratio signal;

whereby the input current is maintained aligned with the direct-axis thereof.

* * * * *